(12) United States Patent
Sharpe

(10) Patent No.: US 7,383,792 B1
(45) Date of Patent: Jun. 10, 2008

(54) HYDROGEN GAS INJECTOR PLUG

(76) Inventor: Thomas H. Sharpe, 55 Dorr Dr., North Augusta, SC (US) 29841

( * ) Notice: Subject to any disclaimer, the term of this patent is extended or adjusted under 35 U.S.C. 154(b) by 0 days.

(21) Appl. No.: 11/902,588

(22) Filed: Sep. 24, 2007

Related U.S. Application Data

(60) Provisional application No. 60/877,138, filed on Dec. 27, 2006.

(51) Int. Cl.
*F02B 43/00* (2006.01)
*F02B 43/04* (2006.01)

(52) U.S. Cl. ..................... 123/1 A; 123/25 A

(58) Field of Classification Search ............ 123/3, 123/DIG. 12, 1 A, 25 B, 25 A, 25 R, 25 D, 123/468, 470
See application file for complete search history.

(56) References Cited

U.S. PATENT DOCUMENTS

| | | | |
|---|---|---|---|
| 3,799,124 A * | 3/1974 | Swain | ............ 123/1 A |
| 4,037,568 A | 7/1977 | Schreiber | |
| 4,140,090 A | 2/1979 | Lindberg | |
| 4,448,160 A * | 5/1984 | Vosper | ............ 123/297 |
| 4,702,894 A | 10/1987 | Cornish | |
| 5,085,176 A | 2/1992 | Brinkley | |
| 5,676,100 A * | 10/1997 | Dam et al. | ............ 123/145 A |
| 5,690,902 A | 11/1997 | Werth | |
| 5,852,993 A * | 12/1998 | Anderson | ............ 123/297 |
| 6,062,185 A * | 5/2000 | Chiu et al. | ............ 123/145 A |
| 6,119,651 A * | 9/2000 | Anderson | ............ 123/297 |
| 6,941,901 B2 * | 9/2005 | Taxon | ............ 123/25 E |
| 2004/0149256 A1 * | 8/2004 | Dye et al. | ............ 123/297 |

* cited by examiner

*Primary Examiner*—Mahmoud Gimie
(74) *Attorney, Agent, or Firm*—Richard C. Litman

(57) ABSTRACT

The hydrogen gas injector plug for generating hydrogen gas from ambient air drawn into the piston chamber of an engine includes an array of nozzles fabricated from a metal or a mixture of metals. When heated to a pre-determined temperature, the metallic nozzles react with atmospheric water to disassociate hydrogen gas. The hydrogen gas is injected from the nozzles into the piston chamber and mixed with air. An ignition device ignites the mixture of hydrogen and air so that it burns to power the piston in a conventional manner. The metallic nozzle is heated via a copper conductor connected to a source of electric current.

14 Claims, 3 Drawing Sheets

HYDROGEN GAS INJECTOR PLUG

CROSS-REFERENCE TO RELATED APPLICATION

This application claims the benefit of U.S. Provisional Patent Application Ser. No. 60/877,138, filed Dec. 27, 2006.

BACKGROUND OF THE INVENTION

1. Field of the Invention

The present invention generally relates to internal combustion engines. More specifically, the present invention is drawn to a device for injecting hydrogen gas into the combustion chamber of an engine for use as a fuel for powering the engine.

2. Description of the Related Art

The rising cost and diminishing supply of hydrocarbon fuels, i.e. gasoline, have increased the criticality of developing or finding alternative fuels. Furthermore, pollution caused by burning hydrocarbon fuels is suspected of creating a "greenhouse" effect in the atmosphere, thereby creating problems that may have a bearing on the future course of human civilization. The art would certainly welcome a device that could utilize a virtually inexhaustible supply of a common element to power internal combustion engines, which device would also cause production of pollution-free byproducts.

The use of hydrogen as a fuel to power engines has been contemplated for many years. Hydrogen is one of the most abundant elements on earth and combustion of this abundant element produces pollution-free water. Unfortunately, hydrogen poses many risks when stored in large quantities, thus creating many problems in making the gas available to the general public. Thus, a hydrogen gas injector plug solving the aforementioned problems is desired.

SUMMARY OF THE INVENTION

The hydrogen gas injector plug is used for generating hydrogen gas from ambient air drawn into the piston chamber of an engine. The plug comprises an array of nozzles fabricated from one or a mixture of metals. When heated to a pre-determined temperature, the metallic nozzles become "white-hot" and generate photons that react with atmospheric water to disassociate hydrogen gas therefrom. The nozzle is designed so that no reaction will occur if the temperature is below 350° F. The hydrogen gas is injected from the nozzles into the piston chamber and mixed with air. An ignition device ignites the mixture of hydrogen and air so that it burns to power the piston in a conventional manner. The metallic nozzle is heated via a copper conductor connected to a source of electric current.

Accordingly, the invention presents a hydrogen gas generator capable of generating small amounts of hydrogen gas from water available in the atmosphere. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
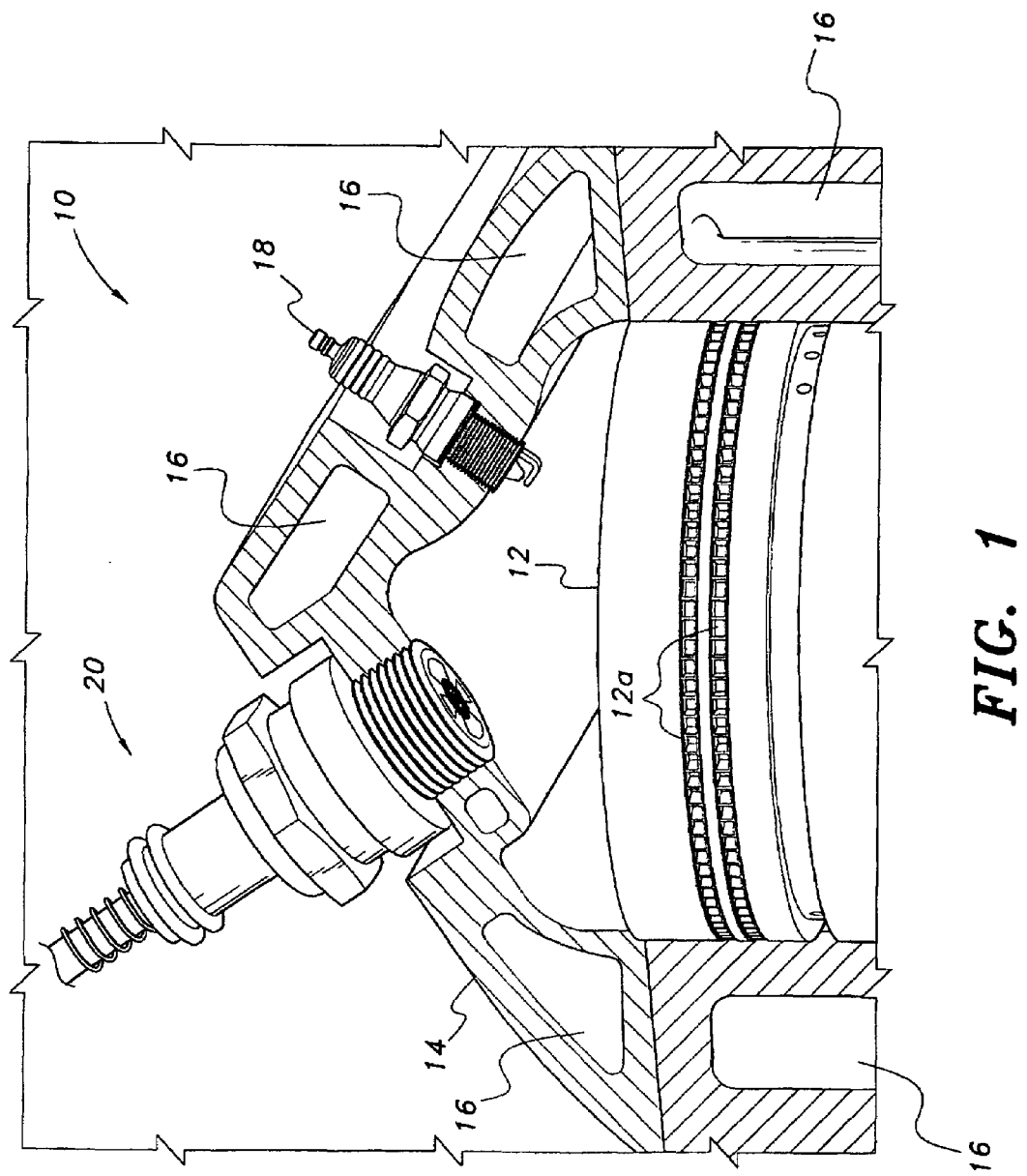
FIG. 1 is an environmental, perspective view of a hydrogen gas generator injector plug according to the present invention.

Attention is first directed to FIG. 1 wherein an engine cylinder chamber is generally indicated at 10. A piston 12 having rings 12a is housed within chamber 10. The head 14 and the cylinder wall are surrounded by coolant chamber 16. Conventional intake and exhaust valves (not shown) are also disposed on head 14. The structure and arrangement of the aforementioned items are conventional and are not part of the inventive concept, per se. A hydrogen gas generator injector plug 20 and a conventional spark plug 18 are mounted on head 14. Injector plug 20 and conventional spark plug 18 each have proximate ends disposed within cylinder chamber 10.

Figure 2:
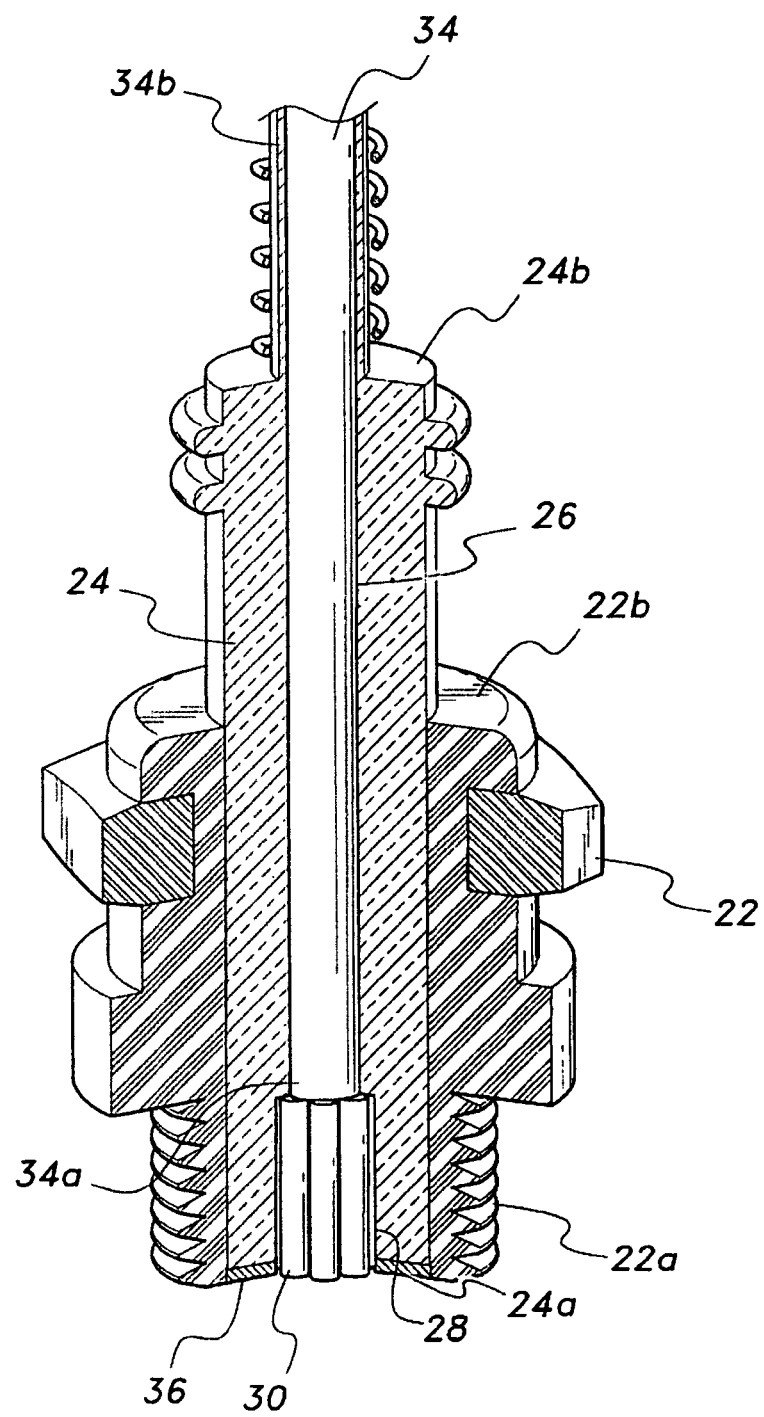
FIG. 2 is a side, sectional view of a hydrogen gas generator injector plug according to the present invention.
Figure 3:
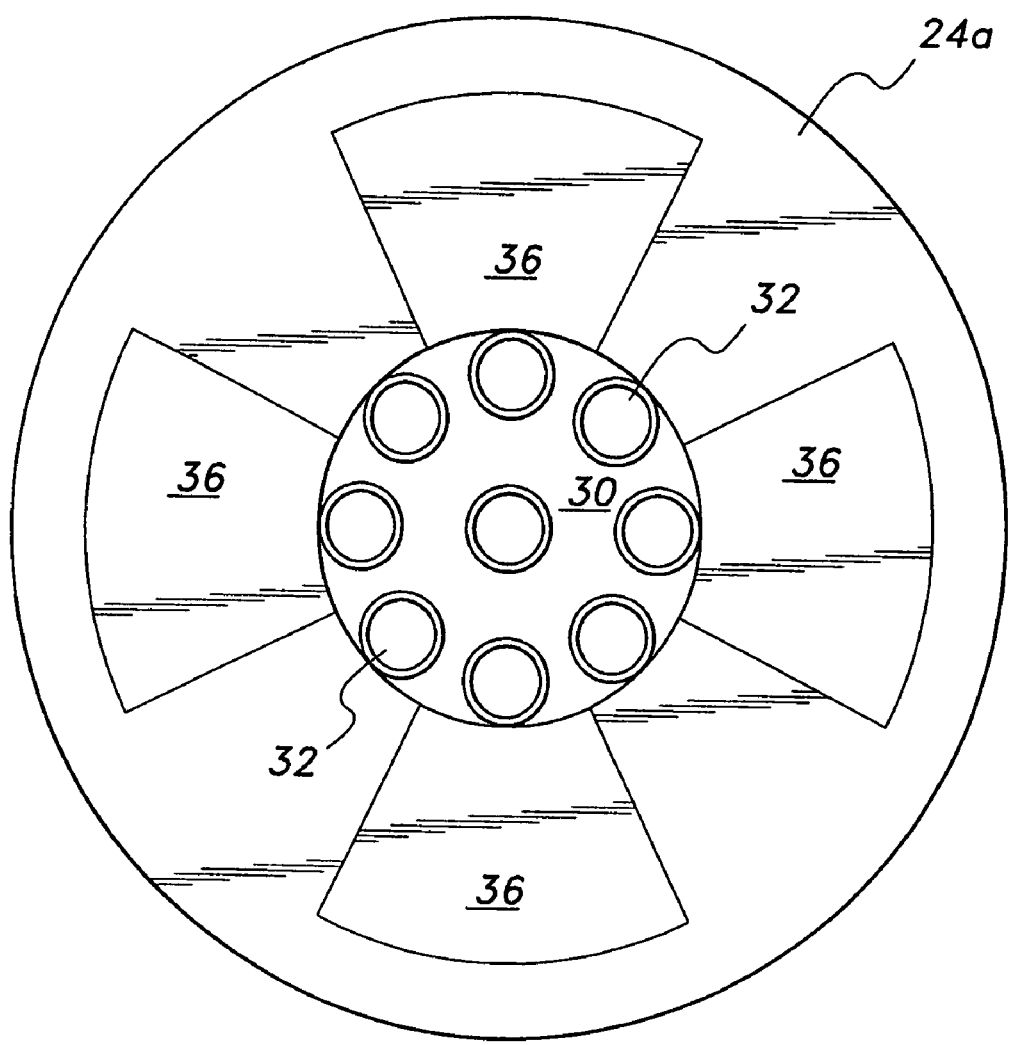
FIG. 3 is an end view of a hydrogen gas generator injector plug according to the present invention.

As best seen in FIGS. 2 and 3, hydrogen gas generator injection plug 20 comprises a circular member 22 fabricated from steel and having a threaded proximate end 22a and a distal end 22b. A passageway extends through member 22 from the distal end 22b to proximate end 22a. An insulation member 24 is disposed in the passageway. Insulation member 24 is fabricated from a material having high temperature insulation characteristics. Member 24 has a first end 24a that is disposed adjacent to, but spaced slightly inwardly of proximate end 22a. The second end 24b of insulation member 24 extends above the distal end 22b of member 22. A passageway 26 extends through insulation member 24 from second end 24b and terminates at a cavity 28, which cavity is formed in the first end 24a of insulation member 24. A nozzle member 30 is positioned in cavity 28. Nozzle member 30 is fabricated from a metal or a metal mixture that has the ability to react with water at relatively high temperatures to oxidize and generate hydrogen gas. Nozzle member 30 must also have the ability to become "white hot" very quickly when an adequate electrical current is applied thereto. As currently contemplated, iron, certain alloys of iron and tungsten exhibit the requisite abilities needed to function as the nozzle member. It should be noted however, that any metal or alloy could be utilized if suitable. An array of hydrogen gas injector passages 32 is formed in nozzle member 30. It has been determined that nine injector passages will provide an adequate amount of hydrogen gas to power piston 12. An electric current conductor 34, preferably fabricated from copper, extends through passageway 26. The lower end 34a of conductor 34 abuts nozzle member 30. The upper end defines a terminal for an electrical connection 34b. Four electrical conductors 36 abut the second end 24a of member 24 and are evenly spaced therearound. Conductors 36 are fabricated from a nickel-copper alloy.

In use, ambient air containing water vapor is drawn into the cylinder chamber via conventional intake valves (not shown) on the intake stroke. A portion of the air water vapor mixture is forced into injector passages 32 on the compression stroke. An electric current is applied to nozzle member 30 via conductor 34 during the latter part of the compression stroke, heating the nozzle member to a "white-hot" temperature. The water vapor reacts with the metal in nozzle member 30 to oxidize the metal and produce hydrogen gas. The hydrogen gas expands through the passages 32 back into the cylinder chamber where it mixes with the oxygen in the air. Spark plug 18 is fired to ignite the mixture, which mixture burns thereby creating a high gas pressure to drive the piston. Occasionally (and in some climates), the humidity may be very low and the ambient air will not contain enough water vapor to produce an adequate amount of hydrogen gas to properly drive the piston. In such instances additional water vapor is injected into the intake valve.

It is to be understood that the present invention is not limited to the embodiment described above, but encompasses any and all embodiments within the scope of the following claims.

I claim:

1. A hydrogen gas injector plug comprising:
    a circular member having a proximate end and a distal end;
    a first passageway extending through said circular member from said proximate end to said distal end;
    a heat insulating member disposed in said first passageway, said heat insulating member having a first end and a second end, said first end terminating adjacent said proximate end of said circular member;
    a second passageway extending through said heat insulating member, said second passageway extending from said first end to said second end of said heat insulating member;
    a cavity formed in said second passageway at said first end;
    a nozzle array disposed in said cavity; and
    a first electrical conductor disposed in said second passageway, said electrical conductor in abutment with said nozzle array.

2. The hydrogen gas injector plug according to claim 1, wherein said circular member has an outer surface having threads disposed on said outer surface at said proximate end.

3. The hydrogen gas generator injector plug according to claim 1, further including plural electrical conductors disposed on said first end of said heat insulating member.

4. The hydrogen gas injector plug according to claim 1, wherein said circular member is fabricated from steel.

5. A hydrogen gas injector plug, comprising:
    a circular member fabricated from steel and having a proximate end, a distal end and an outer surface;
    screw threads disposed on said outer surface at said proximate end;
    a first passageway extending through said circular member from said proximate end to said distal end;
    a heat insulating member disposed in said first passageway, said heat insulating member having a first end and a second end, said first end terminating adjacent said proximate end of said circular member;
    a second passageway extending through said heat insulating member, said second passageway extending from said first end to said second end of said heat insulating member;
    a cavity formed in said second passageway at said first end;
    a nozzle array disposed in said cavity; and
    a copper electrical conductor disposed in said second passageway, said electrical conductor in abutment with said nozzle array.

6. The hydrogen gas injector plug according to claim 5, wherein the number of nozzles in said array is nine.

7. The hydrogen gas injector plug according to claim 5, wherein the number of nozzles in said array is nine, the hydrogen gas injector plug further including plural electrical conductors disposed on said first end of said heat insulating member.

8. The hydrogen gas injector plug according to claim 5, wherein each nozzle in said array is fabricated of material from the group consisting of iron, iron alloys and tungsten.

9. The hydrogen gas injector plug according to claim 5, wherein the number of nozzles in said array is nine, the hydrogen gas injector plug further including plural electrical conductors disposed on said first end of said heat insulating member, each of said plural electrical conductors being fabricated from a nickel-copper alloy.

10. A hydrogen gas injector plug in combination with a piston chamber of an internal combustion engine, the combination comprising:
    a circular member fabricated from steel and having a proximate end, a distal end and an outer surface;
    screw threads disposed on said outer surface at said proximate end for removably mounting said circular member on the piston chamber;
    a first passageway extending through said circular member from said proximate end to said distal end;
    a heat insulating member disposed in said first passageway, said heat insulating member having a first end and a second end, said first end terminating adjacent said proximate end of said circular member;
    a second passageway extending through said heat insulating member, said second passageway extending from said first end to said second end of said heat insulating member;
    a cavity formed in said second passageway at said first end;
    a nozzle array disposed in said cavity;
    a copper electrical conductor disposed in said second passageway, said electrical conductor in abutment with said nozzle array; and
    a spark plug mounted on the piston chamber.

11. The hydrogen gas injector plug combination according to claim 10, wherein the number of nozzles in said array is nine.

12. The hydrogen gas injector plug combination according to claim 10, wherein the number of nozzles in said array is nine, the combination further including plural electrical conductors disposed on said first end of said heat insulating member.

13. The hydrogen gas injector plug combination according to claim 10, wherein each nozzle in said array is fabricated of material from the group consisting of iron, iron alloys and tungsten.

14. The hydrogen gas injector plug combination according to claim 10, wherein the number of nozzles in said array is nine, the combination further including plural electrical conductors disposed on said first end of said heat insulating member, each of said plural electrical conductors being fabricated from a nickel-copper alloy.

* * * * *